No. 791,815. PATENTED JUNE 6, 1905.
R. L. POLLOCK.
FRUIT PITTER AND PARER.
APPLICATION FILED NOV. 19, 1904.
FIG_1_
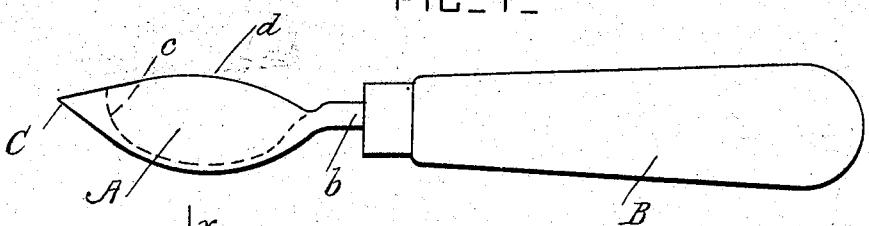
FIG_2_
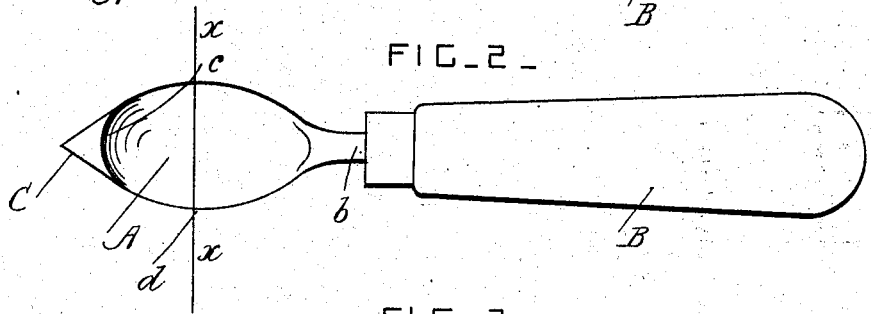
FIG_3_
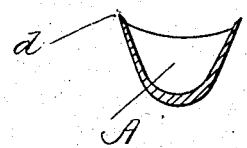
WITNESSES:
INVENTOR
Robert L. Pollock
BY Herbert W. Jenner
Attorney No. 791,815.

Patented June 6, 1905.

UNITED STATES PATENT OFFICE.

ROBERT L. POLLOCK, OF STERLING, KANSAS.

FRUIT PITTER AND PARER.

SPECIFICATION forming part of Letters Patent No. 791,815, dated June 6, 1905.

Application filed November 19, 1904. Serial No. 233,477.

*To all whom it may concern:*

Be it known that I, ROBERT L. POLLOCK, a citizen of the United States, residing at Sterling, in the county of Rice and State of Kansas, have invented certain new and useful Improvements in Fruit Pitters and Parers; and I do hereby declare the following to be a full, clear, and exact description of the invention, such as will enable others skilled in the art to which it appertains to make and use the same.

This invention relates to hand instruments for pitting and paring fruit, such as peaches and apples; and it consists in the novel construction and combination of the parts hereinafter fully described and claimed.

In the drawings, Figure 1 is a side view of the instrument. Fig. 2 is a plan view of the instrument. Fig. 3 is a cross-section taken on the line $x$ $x$ in Fig. 2.

A is an oval concavo-convex scoop provided with a shank $b$ at one end, which is secured in a handle B of any approved form. The other end portion $c$ of the scoop is rounded internally and is provided with a projecting diamond-point piercing-tool C. The edge of the scoop is sharpened at $d$, so as to form a cutting implement for paring the fruit. The cutting edge $d$ is curved and projects upwardly at its middle part, its end portions and the upper surface of the pointed tool C being inclined downwardly.

What I claim is—

A fruit pitter and parer, comprising an oval concavo-convex scoop having a shank at one end, the other end of the said scoop being rounded and provided with a single-pointed piercing-tool, and one side edge of the said scoop having a knife-edge which is curved upwardly at its middle portion, the end portions of the said knife-edge and the upper surface of the said piercing-tool being inclined downwardly.

In testimony whereof I have affixed my signature in the presence of two witnesses.

ROBERT L. POLLOCK.

Witnesses:
 IRA TRIMBLE,
 W. G. PEARSON.